US011663190B2

(12) United States Patent
Goyal et al.

(10) Patent No.: US 11,663,190 B2
(45) Date of Patent: May 30, 2023

(54) SELF-HEALING ACCOUNTING SYSTEM

(71) Applicant: INTERNATIONAL BUSINESS MACHINES CORPORATION, Armonk, NY (US)

(72) Inventors: Munish Goyal, Yorktown Heights, NY (US); Balasubramanian E A, Bengaluru (IN); Sameer Singhdeo, Bangalore (IN); Nithya Ramkumar, Karnataka (IN); Anita Karlsson-Dion, LaGrangeville, NY (US); Raphael Ezry, New York, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 637 days.

(21) Appl. No.: 16/520,923

(22) Filed: Jul. 24, 2019

(65) Prior Publication Data

US 2021/0026829 A1    Jan. 28, 2021

(51) Int. Cl.
*G06F 16/23*        (2019.01)
*G06Q 40/12*        (2023.01)

(52) U.S. Cl.
CPC ............. *G06F 16/23* (2019.01); *G06Q 40/12* (2013.12)

(58) Field of Classification Search
None
See application file for complete search history.

(56) References Cited

U.S. PATENT DOCUMENTS

| 7,013,315 | B1 * | 3/2006 | Boothby ................. G06F 16/27 |
| 7,117,172 | B1 | 10/2006 | Black |
| 8,311,908 | B2 | 11/2012 | Maguire, III et al. |
| 9,043,335 | B2 | 5/2015 | Kapoor et al. |
| 9,043,355 | B1 | 5/2015 | Kapoor et al. |
| 10,025,946 | B1 * | 7/2018 | Holenstein .......... G06F 21/6218 |
| 10,129,118 | B1 * | 11/2018 | Ghare ................... H04L 43/028 |
| 10,866,865 | B1 * | 12/2020 | Morkel ............... G06F 11/1474 |

(Continued)

FOREIGN PATENT DOCUMENTS

| CA | 2260481 | A1 * | 1/1999 | ............. G06F 17/30 |
| DE | 69938508 | | 5/2009 | |

(Continued)

OTHER PUBLICATIONS

Mirzaey et al., "Applications of Artificial Neural Networks in Information System of Management Accounting", International Journal of Mechatronics, Electrical and Computer Technology (IJMEC), vol. 7 (25), Jul. 2017, 8 pages.

*Primary Examiner* — David J Stoltenberg
(74) *Attorney, Agent, or Firm* — Edward Wixted; Andrew D Wright; Calderon Safran & Cole P.C.

(57) ABSTRACT

A method includes: detecting, by a computing device, a new entry in one of plural databases; comparing, by the computing device, the new entry to watch entries defined in a watch database; determining, by the computing device, whether the new entry matches a watch entry in the watch database; creating, by the computing device, a new watch in the watch database when the new entry does not match any watch in the watch database; and updating, by the computing device, a watch in the watch database when the new entry matches the watch in the watch database.

20 Claims, 6 Drawing Sheets

(56) References Cited

U.S. PATENT DOCUMENTS

| | | | |
|---|---|---|---|
| 2004/0133793 A1* | 7/2004 | Ginter | H04N 21/235 |
| | | | 713/193 |
| 2004/0148233 A1 | 7/2004 | Lee | |
| 2005/0209876 A1* | 9/2005 | Kennis | G06Q 10/06311 |
| | | | 726/1 |
| 2010/0250409 A1 | 9/2010 | Savage et al. | |
| 2012/0330915 A1* | 12/2012 | Mehra | G06F 16/252 |
| | | | 707/703 |
| 2013/0232042 A1 | 9/2013 | Simpson et al. | |
| 2014/0207777 A1* | 7/2014 | Palmert | G06F 16/90335 |
| | | | 707/737 |
| 2016/0078556 A1* | 3/2016 | Goldberg | G06Q 40/12 |
| | | | 705/30 |
| 2016/0104163 A1* | 4/2016 | Aquino | G06Q 40/12 |
| | | | 705/44 |
| 2017/0083572 A1* | 3/2017 | Tankersley | G06F 16/24573 |
| 2017/0364918 A1 | 12/2017 | Malhotra et al. | |
| 2018/0173768 A1* | 6/2018 | Troisvallets | G06F 16/24564 |
| 2019/0066229 A1 | 2/2019 | Rephlo et al. | |
| 2019/0205993 A1* | 7/2019 | Rodriguez | G06F 16/219 |
| 2019/0266178 A1* | 8/2019 | Madhavan | G06F 16/2365 |
| 2019/0287182 A1* | 9/2019 | Chetal | G06Q 10/06398 |
| 2019/0361900 A1* | 11/2019 | Rogynskyy | G06F 11/3024 |
| 2019/0385170 A1* | 12/2019 | Arrabothu | G06N 7/005 |
| 2019/0385240 A1* | 12/2019 | Lee | G06N 20/00 |
| 2020/0074563 A1* | 3/2020 | Grosset | G06Q 40/12 |
| 2020/0098053 A1* | 3/2020 | Lesner | G06N 3/08 |
| 2020/0279050 A1* | 9/2020 | Endler | G06F 9/542 |
| 2020/0402058 A1* | 12/2020 | Zhou | G06F 9/54 |

FOREIGN PATENT DOCUMENTS

| | | | |
|---|---|---|---|
| KR | 10-1084440 B1 * | 11/2009 | G06F 17/00 |
| WO | 02075488 A2 | 9/2002 | |

* cited by examiner

| | 301 | 302 | 303 | 304 | 305 | 306 | 307 |
|---|---|---|---|---|---|---|---|
| E | 90066 | Payable | 0-30 days | Adjustments | Reclass | ABC vendor | $9,474,555.99 |
| B | 5456 | Payable Adjustment | Above 180 days | Payable | Account Payable | Wrong coding by team | $36,230.36 |
| A | 5456 | Payable Adjustment | Above 180 days | Adjustments | Reporting Adjustments | Prime Co. | -$36,623.22 |
| C | 5456 | Payable Adjustment | Above 180 days | Adjustments | Reporting Adjustments | Prime Co. | $365.31 |
| D | 5431 | Payable Adjustment | Above 180 days | Adjustments | Reporting Adjustments | Prime Co. | $27.55 |

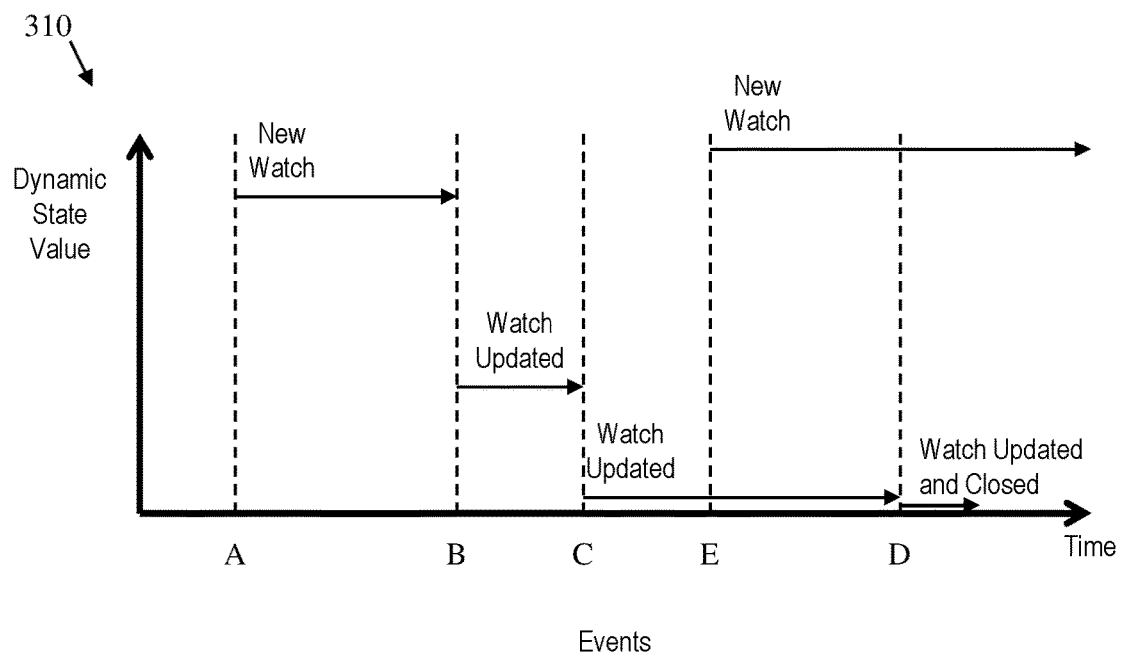

FIG. 3

SELF-HEALING ACCOUNTING SYSTEM

BACKGROUND

The present invention relates generally to computer based accounting systems and, more particularly, to a self-healing accounting system.

Modern enterprises typically utilize different accounting systems that handle very large numbers of transactions (e.g., tens of thousands, or more) at any given time. Reconciliation of entries in these systems is performed manually, e.g., by users, to address issues such as compliance issues and provisioning issues.

SUMMARY

In a first aspect of the invention, there is a computer-implemented method including: detecting, by a computing device, a new entry in one of plural databases; comparing, by the computing device, the new entry to watch entries defined in a watch database; determining, by the computing device, whether the new entry matches a watch entry in the watch database; creating, by the computing device, a new watch in the watch database when the new entry does not match any watch in the watch database; and updating, by the computing device, a watch in the watch database when the new entry matches the watch in the watch database.

In another aspect of the invention, there is a computer program product including a computer readable storage medium having program instructions embodied therewith. The program instructions are executable by a computer device to cause the computer device to: detect a new entry in one of plural databases; compare the new entry to watch entries defined in a watch database, wherein the comparing comprises determining a respective association score for the new entry relative to respective ones of the watch entries; determine that the new entry matches one of the watch entries; and update a watch amount associated with the one of the watch entries based on an amount in the new entry.

In another aspect of the invention, there is system including a processor, a computer readable memory, and a computer readable storage medium. The system includes: program instructions to detect a new entry in one of plural databases; program instructions to compare the new entry to watch entries defined in a watch database; program instructions to determine whether the new entry matches a watch entry in the watch database; program instructions to create a new watch in the watch database when the new entry does not match any watch in the watch database; and program instructions to update a watch in the watch database when the new entry matches the watch in the watch database. The program instructions are stored on the computer readable storage medium for execution by the processor via the computer readable memory.

BRIEF DESCRIPTION OF THE DRAWINGS

The present invention is described in the detailed description which follows, in reference to the noted plurality of drawings by way of non-limiting examples of exemplary embodiments of the present invention.

FIG. 3 depicts an exemplary use case in accordance with aspects of the invention.

DETAILED DESCRIPTION

Figure 1:
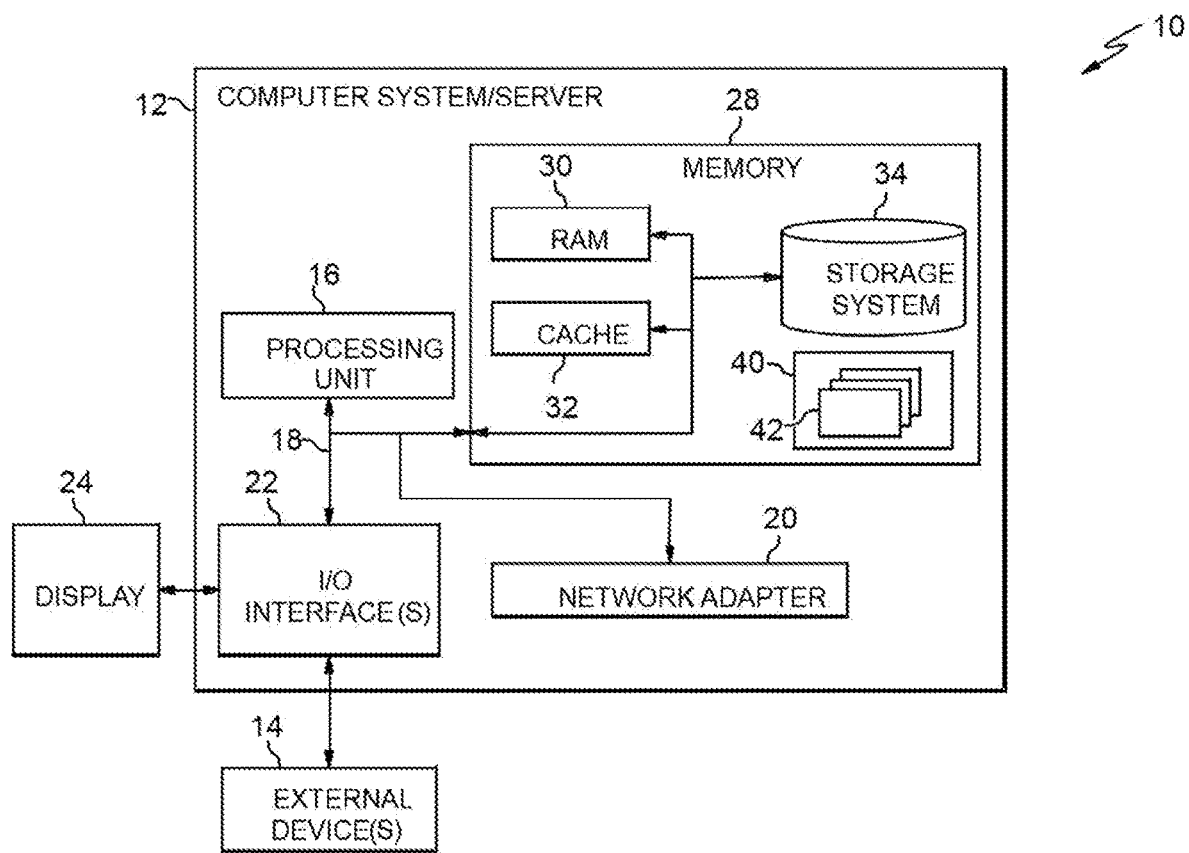
FIG. 1 depicts a computer infrastructure according to an embodiment of the present invention.

The present invention relates generally to computer based accounting systems and, more particularly, to a self-healing accounting system. According to aspects of the invention, there is an accounting watch system that utilizes a dynamic state machine which is instantiated at a time of an entry (e.g., a transaction or a journal entry) in a computer-based accounting database. In embodiments, the state machine watches (e.g., monitors) each new entry after its creation for a possible match against the open entry using accounting rules. In implementations, a cognitive matching engine uses multiple simultaneous journal entry attributes in conjunction with the context of the entry to predict an association score representing how likely it is that the current entry is a closure or an update of the entry that created a given watch state. When a match is identified, the system uses rules to either automatically update the state machine or prompt a user for action/feedback.

In an aspect of embodiments of the invention, the system determines that a current transaction is a closing entry associated with an open entry that is currently being watched, but the closing entry differs from the open entry in some regard. The difference might include, for example, a different amount, different account number, different account type, etc. These differences are exemplary and not intended to be limiting, and implementations of the invention can be configured to account for these and other types of differences. In this embodiment, the system is configured to automatically trigger the creation of at least one additional journal entry to rectify the difference between the closing entry and the open entry. This is described in greater detail herein with respect to FIG. 5.

In another aspect of embodiments of the invention, the system determines a situation when a closing entry is not found within defined accounting norms and, based on this determination, the system automatically creates a provision per the norms while the balance amount is kept under watch. In this manner, the system advantageously ensures business compliance with the norms. This is described in greater detail herein with respect to FIG. 6.

In embodiments, the state machine remains active until either the account balance is exhausted or the entry expires or auto-closed by an identified closing entry. At each update to the state machine, appropriate accounting actions are taken based on the context of the transaction (e.g., accrual, provisioning, payment etc.). In this manner, implementations of the invention provide a system that automatically resolves open accounting database entries by monitoring and matching subsequent entries to the open entry, and by updating the open entry based on the matching entry. The computer based monitoring, matching, and updating in accordance with aspects of the invention advantageously reduces or eliminates downstream manual tasks such as reconciliation, validation, approval, and auditing.

Modern enterprises typically utilize different accounting systems that handle very large numbers of transactions (e.g., tens of thousands, or more) at any given time. As a result of the very large number of transactions, the real-time visibility of any one transaction is limited, and this creates a manual reconciliation issue. Current systems provide reporting analytics that identify transactions that are later reconciled manually. Such manual reconciliation is very time consuming for one or more users to perform. The large number of transactions that require manual reconciliation combined with the amount of time needed to perform manual reconciliation often results in a failure to perform an appropriate accounting action in a timely manner. For example, a problem may arise when an enterprise should provide for bad debts based on the aging of some old vendor debit balance, and this issue is missed due to non-linkage of the transactions in different accounting databases.

Embodiments of the invention address these problems by providing a system that tracks (e.g., monitors) open accounting entries at the transaction level over time across a multitude of accounting databases. The system auto-creates closing or adjustment entries in response to new transactions based on the context and accounting rules, thereby enabling a self-healing accounting system.

Embodiments of the invention improve the technology of computer based accounting systems by automatically monitoring, matching, and updating accounting database entries across different databases in near real time. Implementations of the invention do not automate the current process of manual reconciliation, but instead eliminate the number of occurrences of manual reconciliation by automatically applying automated closing and/or adjusting of open entries at the transaction level before reconciliation is needed. In this manner, implementations of the invention do not simply automate an existing process, but instead provide new processes that simplify the existing processes by enabling self-healing of the accounting system.

Embodiments of the invention employ an unconventional arrangement of steps including: detect a new entry in one of plural databases; compare the new entry to watches defined in a watch database; determine whether the new entry matches a watch in the watch database; create a new watch in the watch database when the new entry does not match a watch in the watch database; and update a watch in the watch database when the new entry does match a watch in the watch database. The steps themselves are unconventional, and the combination of the steps is also unconventional. For example, in embodiments, the step of comparing the new entry to watches defined in a watch database creates new information (e.g., an association score) that does not exist in the system, and this new data is then used in subsequent steps in an unconventional manner (e.g., determining whether the new entry matches a watch in the watch database).

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to FIG. 1, a schematic of an example of a computer infrastructure is shown. Computer infrastructure 10 is only one example of a suitable computer infrastructure and is not intended to suggest any limitation as to the scope of use or functionality of embodiments of the invention described herein. Regardless, computer infrastructure 10 is capable of being implemented and/or performing any of the functionality set forth hereinabove.

In computer infrastructure 10 there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system executable instructions, such as program modules, being executed by a computer system. Generally, program modules may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system 12 in computer infrastructure 10 is shown in the form of a general-purpose computing device. The components of computer system 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc.

Figure 2:
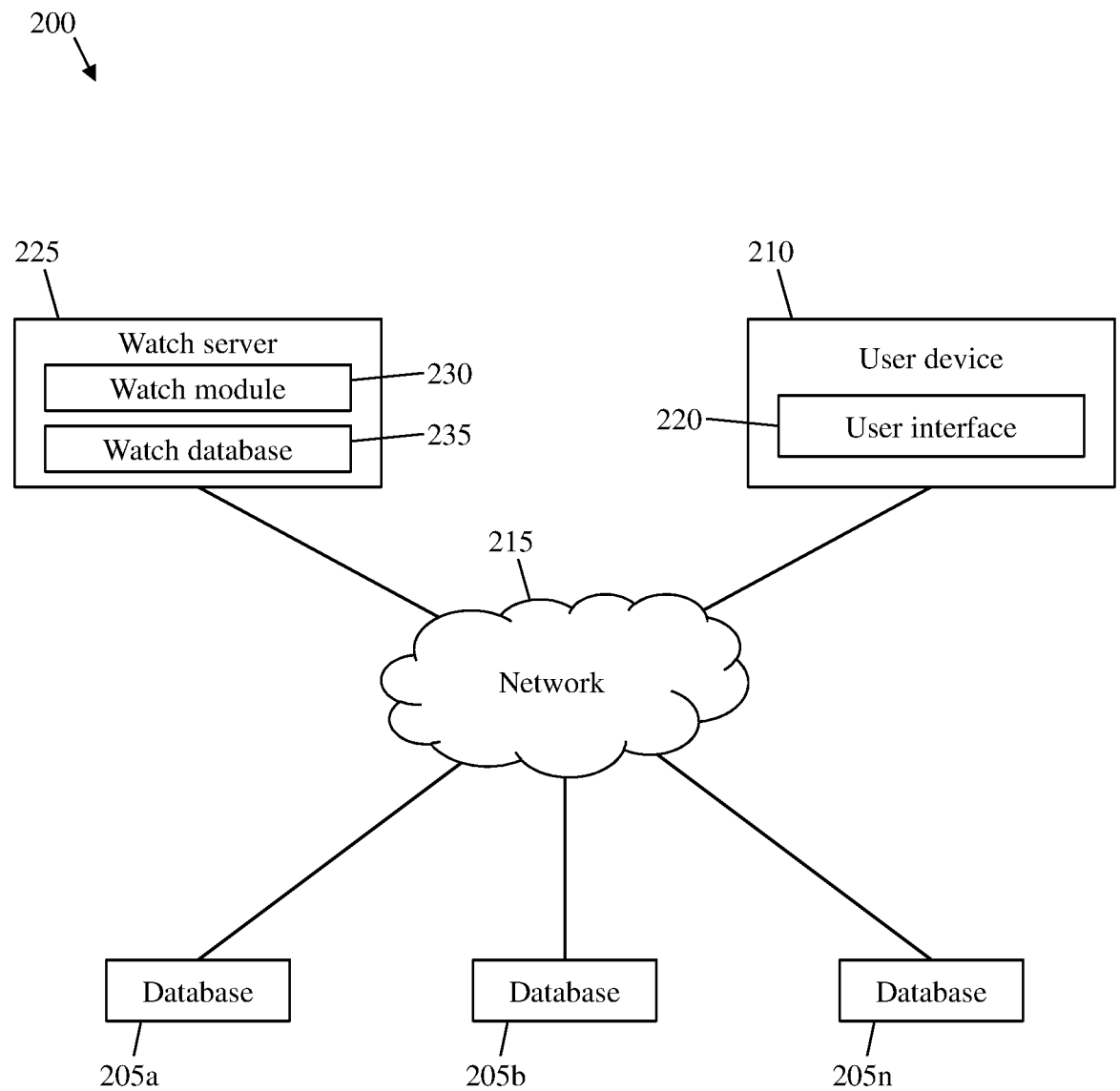
FIG. 2 shows a block diagram of an exemplary environment in accordance with aspects of the invention.

FIG. 2 shows a block diagram of an exemplary environment 200 in accordance with aspects of the invention. The environment 200 includes plural databases 205a, 205b, . . . , 205n that are accessible by a user device 210 via a network 215. In embodiments, each of the databases 205a-n is an accounting database such as a payroll database, a billing records database, a human resources records database, an accounts receivable database, an accounts payable database, etc. Any number "n" of databases may be included in the databases 205a-n, and the types of databases are not limited to the examples provided herein.

The user device 210 is a computer device including one or more elements of the computer system 12 of FIG. 1, and includes a user interface 220 that permits a user to access data stored in the databases 205a-n. In embodiments, the user interface 220 comprises a graphic user interface that is dynamically displayed on a visual display of the user device 210, and that permits a user to provide input to perform database functions with the databases 205a-n. For example, the user interface 220 may be configured to permit a user to: provide input to define a query to one or more of the databases 205a-n, and to display a result of the query; and provide input that defines data to be stored in one or more of the databases 205a-n.

In some implementations, the environment 200 includes plural user devices 210 that permit different users (e.g., of an enterprise) to interact with the databases 205a-n. The user device(s) 210 communicate with the databases 205a-n via the network 215, which comprises one or more communication networks such as one or more of a LAN, a WAN, and the Internet.

In accordance with aspects of the invention, the environment 200 includes a watch server 225 comprising a watch module 230 that is configured to perform one or more of the functions described herein, including but not limited to: detect a new transaction or journal entry (collectively referred to herein as a new entry) in one of the databases 205a-n; compare the new entry to watches defined in a watch database 235; determine whether the new entry matches a watch in the watch database 235; create a new watch in the watch database 235 when the new entry does not match a watch in the watch database 235; and update a watch in the watch database 235 when the new entry does match a watch in the watch database 235.

In embodiments, the watch server 225 is a computer device including one or more elements of the computer system 12 of FIG. 1, and the watch module 230 comprises one or more program modules 42 described with respect to FIG. 1. In embodiments, the watch database 235 and the databases 205a-n each comprise database software that stores data (e.g., in a storage system 34) in a structured manner. The watch server 225 may include additional or fewer modules than those shown in FIG. 2. In embodiments, separate modules may be integrated into a single module. Additionally, or alternatively, a single module may be implemented as multiple modules. Moreover, the quantity of devices and/or networks in the environment is not limited to what is shown in FIG. 2. In practice, the environment 200 may include additional devices and/or networks; fewer devices and/or networks; different devices and/or networks; or differently arranged devices and/or networks than illustrated in FIG. 2.

According to aspects of the invention, the watch server 225 and watch module 230 constitute a watch system that is configured to instantiate a watch state to record each open entry in one of the databases 205a-n at a time of origin of the entry. As used herein, an open entry refers to an accounting entry in one of the databases 205a-n that, if left unchanged, would require manual reconciliation at a later date. Examples of types of open entries include but are not limited to: a charge for work that has been done but not yet invoiced, for which provision is made at the end of a financial period; a bonus accrual for an employee when the bonus has not yet been paid; etc.

In embodiments, the watch module 230 utilizes a context based machine learning (ML) engine to predict a watch state time out, potential pairing of accounts information, and recommended action sets. In additional embodiments, the watch module 230 utilizes an entry context matching engine to match future transactions against the context of an originating watch state according to predefined accounting rules. In further embodiments, the watch module 230 cooperates with the user device 210 to generate the user interface 220 that shows a watch tower that is used to: monitor accounting entries across accounting systems over time, and evaluate for possible closure of the watch state using the entry context matching engine. In still further embodiments, the watch module 230 provides for closure of the watch state of a given entry with context dependent actions resulting either in creation of journal entries to reverse original entries, or adjustment to account for discrepancies.

In accordance with aspects of the invention, the watch module 230 performs an "account to account watch" function by creating a mapping table with a source and match account code. In embodiments, the entries made in any of the accounts included in the mapping table are shown in the watch tower, e.g., via the user interface 220. When the watch module 230 detects a new entry that corresponds to an open entry and that has a same amount as the open entry, the watch module 230 marks the open entry as closed. When the watch module 230 detects a new entry that corresponds to an open entry and that has a different amount than the open entry, the watch module 230 adjusts the amount of the open entry or closes the open entry and creates a new entry to account for the offset.

In accordance with additional aspects of the invention, the watch module 230 performs a "transaction watch" function, in which a new watch state is created each time a new transaction is created by a user or the system. In embodiments, the watch state is a state in which the watch module 230 actively monitors all other transactions in all the databases 205a-n based on the account or a set of matching criteria. For example, a transaction watch may be defined for a transaction type, such as but not limited to, accrual, bad debts, provisions, and prepayments. In this watch state, the watch module 230 marks the watch item as closed when it finds a corresponding entry. When performing the transaction watch function, the watch module 230 will, based on the nature of the account, automatically trigger the creation of new journal entries to reverse the original entry that was made at the time of creation of the watch. This auto-triggering ensures that the accounting records reflect the correct financials and are in compliance with accounting standards.

In accordance with further aspects of the invention, the watch module 230 performs a "provision watch" function in which a transaction is classified as bad debt or bad receivable based on predefined accounting policies. In this function, a provision is created with the transaction. In embodiments, the watch module 230 creates a watch that monitors all new transactions in all the databases 205a-n for transactions that match the provision, e.g., according to predefined accounting rules.

FIG. 3 depicts an exemplary use case in accordance with aspects of the invention. The use case may be performed in the environment of FIG. 2 and is described with reference to elements depicted in FIG. 2. Table 300 shows data associated with different events A, B, C, D, E that are input as entries (e.g., transactions or journal entries) in respective ones of the databases 205a-n. Columns 301-307 contain attributes (e.g., data) associated with each one of the entries of the events A-E. In this example, column 301 is a transaction code, column 302 is a first transaction description, column 303 is a transaction time, column 304 is a second transaction description, column 305 is a third transaction description, column 306 is an entity associated with the transaction, and column 307 is a transaction amount. These columns and the data contained therein are exemplary and not limiting, and other numbers of columns with different types of data may be used in implementations of the invention. For example, other types of attributes that may be used include but are not limited to: item reference (e.g., a unique identifier assigned to the journal entry), date, account segment (e.g., an account associated with the journal entry), account name, data source, system/manual (e.g., an identifier specifying whether the journal entry was created automatically or manually), aging days, type (e.g., adjustment, explanation, payable, etc.), category (e.g., reversal, re-class, reporting adjustment, revaluation, account payable, etc.), description, and amount.

Still referring to FIG. 3, the graph 310 shows the events A-E plotted against dynamic state value (on the vertical axis) and time (on the horizontal axis). In this example, event A occurs first in time, followed by event B, then events C, E, and D in that order.

With continued reference to FIG. 3, in this example, when event A is recorded as an entry in one of the databases 205a-n, the watch module 230 determines that event A is a new entry that does not match (e.g., correspond to) a watch of an open entry as defined in the watch database 235. In embodiments, and as described herein, the watch module 230 determines that event A does not match any other entry by comparing the attributes of event A to the attributes of open entries that are the subject of watches defined in the watch database 235. Based on this determination, the watch module 230 opens a new watch for event A. In embodiments, the new watch is a dynamic state machine, created by the watch module 230, that monitors the amount of the entry and the expiration time of the entry. In embodiments, the dynamic state machine comprises or maintains a data structure that stores data, such as an amount, that is changed in response to actions as described herein. In some embodiments, the dynamic state machine is a computer-based process or object that is generated using programming, such as a script or a programming module, and that is configured to perform watch functions in the manner described herein.

In the example of FIG. 3, when event B is recorded as an entry in one of the databases 205a-n, the watch module 230 determines that event B matches event A, e.g., by comparing the attributes of event B to the attributes of open entries (including that of event A) that are the subject of watches defined in the watch database 235. Based on determining that event B matches event A, the watch module 230 updates the watch for event A. In this example, the updating comprises adjusting an amount defined in the watch by summing the amount of event A (−$36,623.22) and the amount of event B ($36,230.36) to obtain an updated amount (−$392.86) associated with event A. In embodiments, the watch module 230 stores the updated amount (−$392.86) in the watch associated with event A.

Still referring to the example of FIG. 3, when event C is recorded as an entry in one of the databases 205a-n, the watch module 230 determines that event C matches event A, e.g., by comparing the attributes of event C to the attributes of open entries (including that of event A) that are the subject of watches defined in the watch database 235. Based on determining that event C matches event A, the watch module 230 updates the watch for event A. In this example, the updating comprises adjusting an amount defined in the watch (which is currently −$392.86) by the amount of event C ($365.31) to obtain an updated value (−$27.55) associated with event A. In embodiments, the watch module 230 stores the updated value (−$27.55) in the watch associated with event A.

In the example of FIG. 3, when event E is recorded as an entry in one of the databases 205a-n, the watch module 230 determines that event E does not match event A, e.g., by comparing the attributes of event E to the attributes of open entries (including that of event A) that are the subject of watches defined in the watch database 235. Based on this determination, the watch module 230 opens a new watch for event E.

With continued reference to the example of FIG. 3, when event D is recorded as an entry in one of the databases 205a-n, the watch module 230 determines that event D matches event A, e.g., by comparing the attributes of event D to the attributes of open entries (including that of event A) that are the subject of watches defined in the watch database 235. Based on determining that event D matches event A, the watch module 230 updates the watch for event A. In this example, the updating comprises adjusting an amount defined in the watch (which is currently −$27.55) by the amount of event C ($27.55) to obtain an updated value ($0.00) associated with event A. In embodiments, since the amount of the watch of event is now zero, the watch module 230 closes the watch associated with event A.

According to aspects of the invention, and as described with respect to the use case of FIG. 3, the watch module 230 determines whether each new entry in any of the databases 205a-n matches an existing watch, e.g., a watch of an open entry defined in the watch database 235. In embodiments, the watch module 230 determines a match by determining an association score for a new entry relative to an open entry that is the subject of a watch (referred to herein as a watch entry), and comparing the association score to predefined thresholds. The association score for a new entry is a quantitative measure of the likelihood that the new entry matches (corresponds to) a watch entry. In embodiments, the association score is in the range of 0 to 1, inclusive. An association score of 0 indicates a 0% probability that two entries are related, and an association score of 1 indicates a 100% probability that two entries in a pair are related. The closer the association score is to 1, the greater the probability that the two entries are related. In embodiments, the watch module 230 is programmed with logic that is configured to determine the association score based on one or more predefined accounting rules and/or comparing one or more entry attributes as described herein.

Accounting rules can include predefined relationships between types of entries. For example, one such rule is that an accrual is followed by a payment. Accordingly, when the new entry is a payment and the watch entry is an accrual, the watch module 230 may be configured to increase an association score of a new entry if the new entry (the payment entry) is after the watch entry (the accrual entry), and to decrease the association score of the new entry when the new entry (the payment entry) is prior to the watch entry (the accrual entry). This is only one example of an accounting rule, and other types of accounting rules may be programmed in the watch module 230. Accordingly, the watch module 230 may be configured to increase an association score of a new entry that satisfies an accounting rule, and to decrease the association score of a new entry that does not satisfy the accounting rule.

In some embodiments, additionally or alternatively to using accounting rules, the watch module 230 determines the association score by comparing data (e.g., attributes) of entries. Attributes can include a relative timing of the two entries. For example, some related entries are performed in a certain order relative to one another, meaning that an entry that is not performed in the correct order is not likely to be a match to an entry that requires the order. Accordingly, the watch module 230 may be configured to increase the association score of entries that satisfy a timing requirement, and to decrease the association score of entries that do not satisfy a timing requirement.

Attributes can also include which one of the databases 205a-n each of the respective entries is recorded in. For example, for some types of watched entries, there is a higher likelihood that an entry in a particular one of the databases 205a-n correspond to the watch entry, and a lower likelihood that an entry in other ones of the databases 205a-n correspond to the watch entry. Accordingly, for a given watch entry, the watch module 230 may be configured to increase the association score of entries that are in a particular one of the databases 205a-n, and to decrease the association score of entries that are not in the particular one of the databases 205a-n.

Attributes can also include text included in the respective entries, e.g., the new entry and the watch entry. For example, some entries include one or more attributes that are defined by text, and the watch module 230 may use one or more text similarity algorithms to determine a similarity of the text of a new entry to that of a watch entry. Accordingly, for a given watch entry, the watch module 230 may be configured to increase the association score of entries that have a higher similarity of text, and to decrease the association score of entries that have a lower similarity of text. In embodiments, the text similarity need not be an exact match (e.g., 100%), and instead, the one or more text similarity algorithms may be used to determine relative degree of similarity of the text of a new entry to that of a watch entry (e.g., any value in the range of 0% to 100%). In embodiments, the text similarity algorithms may be based on natural language processing techniques.

Attributes can also include the amounts (e.g., monetary amounts) included in the respective entries, e.g., the new entry and the watch entry. In embodiments, for a given watch entry, the watch module 230 defines a range of expected values for matching entries. The range can be, for example, plus or minus ten percent of the amount of the watch entry. Accordingly, for a given watch entry, the watch module 230 may be configured to increase the association score of entries that have an amount within the determined range, and to decrease the association score of entries that have an amount outside the determined range. In embodiments, the watch module 230 determines different ranges for different types of watch entries. For example, a first type of watch entry (e.g., bonus) might have a range of plus or minus ten percent, while a second type of watch entry (e.g., rent) might have a range of plus or minus five percent, while a third type of watch entry (e.g., vendor invoice) might have a range of plus or minus three percent. In this manner, the watch module 230 determines different ranges for different types of watch entries. In embodiments, the different ranges are defined by rules programmed in the watch module 230. Aspects of the invention are not limited to these attributes for determining an association score, and different numbers and/or different types of attributes can be compared to determine the association score in other embodiments.

In a particular embodiment, the watch module 230 is configured to determine an association score for a new entry by adjusting a default score up or down based on one or more accounting rules and also based on a comparison of each one of plural attributes. In this embodiment, the watch module 230 determines the association score by: adjusting a default score up or down based on at least one accounting rule; further adjusting the score up or down based on comparing the relative timing of the new entry and the watch entry; further adjusting the score up or down based on comparing the databases of the new entry and the watch entry; further adjusting the score up or down based on comparing the text included in the new entry and the watch entry; and further adjusting the score up or down based on comparing the amounts included in the new entry and the watch entry. In this manner, the association score is affected by each of the applicable accounting rules and each of the attributes, e.g., with the comparison of each one of the attributes contributing to the overall association score. The default score may be a predefined default score or, alternatively, may be determined based on predefined accounting rules. For example, similar to the ranges, different default scores may be used for different types of watch entries, and these different default scores may be defined by rules programmed in the watch module 230.

As noted above, the association score represents a quantitative measure of the likelihood that a new entry matches (corresponds to) a watch entry (e.g., an open entry for which a watch is active). In embodiments, when a new entry occurs in any one of the databases 205a-n, the watch module 230 determines a respective association score for the new entry relative to each current watch defined in the watch database 235. For example, if there are 1500 watches in the watch database 235, then the watch module 230 determines 1500 different association scores for this one new entry. In embodiments, the watch module 230 determines the highest one of the plural association scores (e.g., the highest one of the 1500 scores in this example) and compares that highest association score to two thresholds, a high threshold and a low threshold. In the event the highest association score is above the high threshold, the watch module 230 deems that the new entry matches the watch associated with the highest association score, and performs an automated function as a result of this determined match. The automated function may include, for example, updating an amount of the watch without prompting a user for input, e.g., similar to that described in the use case of FIG. 3. Additionally or alternatively, the automated function may include the watch module 230 auto-creating a closing entry or an adjustment entry (e.g., a rectification entry) related to the open entry.

In the event the highest association score is above (greater than) the low threshold and below (less than) the high threshold, the watch module 230 deems that the new entry likely matches the watch associated with the highest association score, and prompts a user to provide input to confirm the match and/or perform a manual action. The prompt may be presented by the watch module 230 to the user via the user interface 220. In embodiments, in response to receiving user input confirming the match in response to the prompt, the watch module 230 performs an automated function as a result of this user-confirmed match. The automated function may include, for example, updating an amount of the watch.

In the event the highest association score is below (less than) the low threshold, the watch module 230 deems that the new entry does not match the watch associated with the highest association score. Since the new entry does not match the watch with the highest association score, the watch module 230 determines that the new entry does not match any of the watches defined in the watch database 235, and creates a new watch for this new entry.

Figure 4:
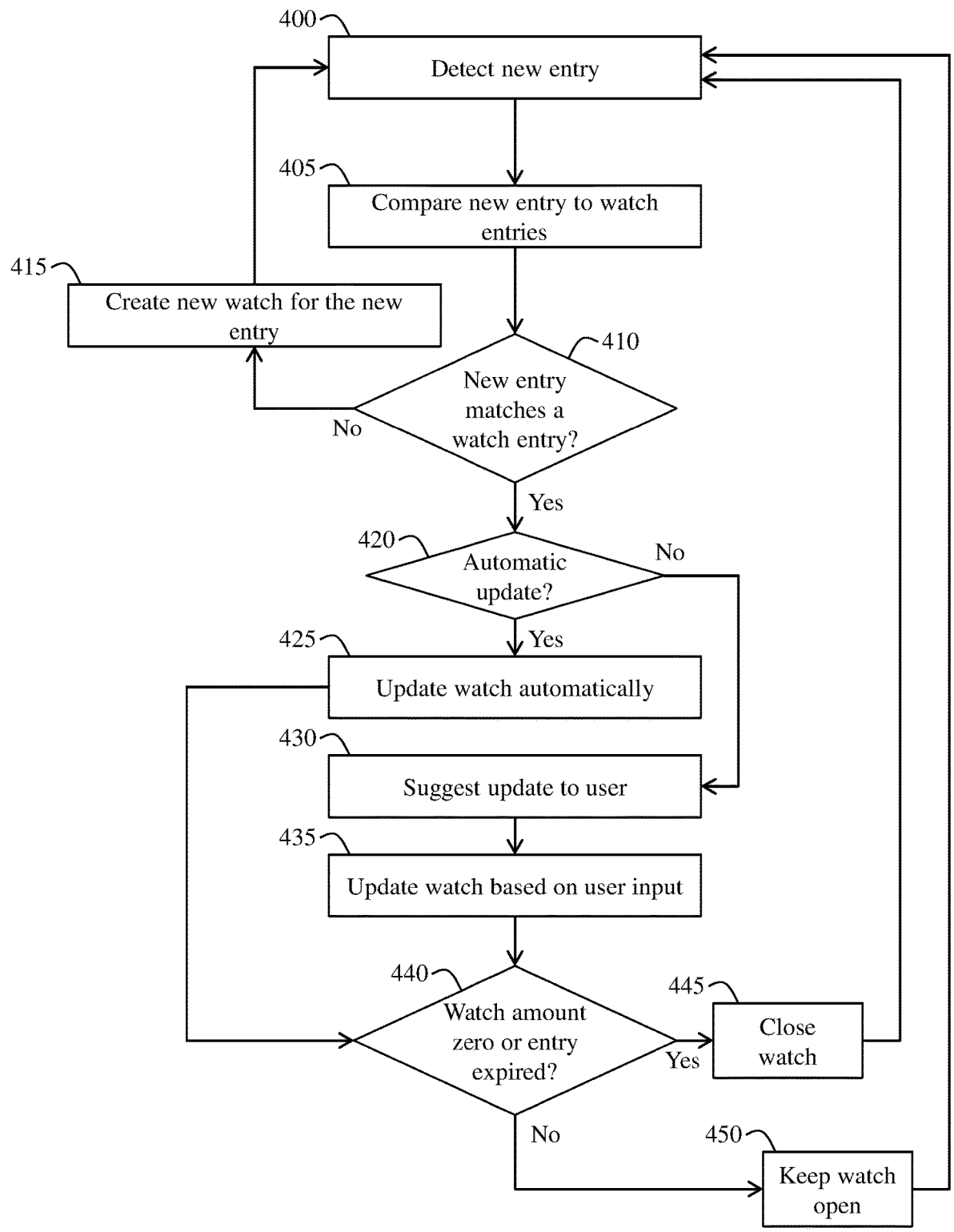
FIG. 4 shows a flowchart of an exemplary method in accordance with aspects of the invention.

FIG. 4 shows a flowchart of an exemplary method in accordance with aspects of the present invention. Steps of the method may be carried out in the environment of FIG. 2 and are described with reference to elements depicted in FIG. 2.

At step 400, the system detects a new entry in one of the databases 205a-n. In embodiments, and as described with respect to FIG. 2, the watch module 230 detects a new entry (e.g., a transaction or a journal entry) at one of the databases 205a-n. Step 400 may involve each one of the databases 205a-n automatically notifying the watch module 230 when a new entry is recorded, or may comprise the watch module 230 periodically polling each of the databases 205a-n to respond with an indication of new entries.

At step 405, the system compares the new entry to watch entries. In embodiments, and as described herein, the watch module 230 determines a respective association score for the new entry (from step 400) relative to each of the watch entries defined by watches in the watch database 235. As described herein, the association score may be determined based on one more accounting rules and/or a comparison of one or more attributes of the new entry to the watch entry associated with the respective watch.

At step 410, the system determines whether the new entry matches a watch entry. In embodiments, and as described herein, the watch module 230 compares the highest association score (from step 405) to a low threshold. In the event the highest association score is less than the low threshold, then there is no match, and the process proceeds to step 415 where the watch module 230 creates a new watch for the new entry (from step 400). In embodiments, and as described herein, the watch is a dynamic state machine created by the watch module 230 that continuously monitors an amount associated with the new entry. Step 415 may comprise the watch module 230 saving the new watch in the watch database 235.

On the other hand, if the highest association score is greater than the low threshold, then there is a match, and the process proceeds to step 420 where the watch module 230 determines whether to perform an automatic update or to prompt a user for input. In embodiments, and as described herein, the watch module 230 compares the highest association score (from step 405) to a high threshold. In the event the highest association score is greater than the high threshold, then this match qualifies for an automatic update, and the process proceeds to step 425 where the watch module 230 automatically updates the watch (associated with the highest association score) based on the new entry (from step 400). In embodiments, and as described herein, updating the watch at step 425 comprises updating a state of the watch, such as updating an amount of the watch, e.g., similar to that described in the use case of FIG. 3.

Following step 425, the process proceeds to step 440 where the system determines whether the amount of the watch (after updating) equals zero and whether the entry associated with the watch has expired. In embodiments, and as described herein, the watch module 230 determines whether the adjustment at step 425 causes the amount of the watch to be zero, e.g., similar to event D described with respect to the use case in FIG. 3. In the event the amount of the watch is determined to be zero, then at step 445 the watch module 230 closes this watch. In embodiments, closing the watch includes setting a status of the watch to "closed" in the watch database 235 so that this watch is not compared to subsequent new entries. In a particular embodiment, step 445 includes the watch module 230 performing at least one of: sending a notification to a user (e.g., via the user interface 220), the notification indicating that the watch is closed due to being zeroed; and automatically entering a notation in the entry associated with the watch, the notation indicating that the watch is closed due to being zeroed.

Still referring to step 440, the watch module 230 also determines whether the entry associated with the watch (e.g., the watch associated with the highest association score) has expired. In embodiments, the watch module 230 analyzes the expiration status by applying one or more predefined rules (e.g., vendor invoice entries expire after 90 days) and/or analyzing one or more attributes of the entry (e.g., entry date, expiration date, etc.). In the event the amount of the watch is determined to be zero, then at step 445 the watch module 230 closes this watch. In embodiments, closing the watch as a result of expiration includes deleting the watch from the watch database 235, and also at least one of: sending a notification to a user (e.g., via the user interface 220), the notification indicating that the watch is closed due to expiration and suggesting that the user create a new entry; and automatically entering a notation in the entry associated with the watch, the notation indicating that the watch is closed due to expiration.

With continued reference to step 440, if either condition is satisfied (e.g., in the watch amount is zero or if the entry is expired), then the process proceeds to step 445 as described above. If neither condition is satisfied, then the process proceeds to step 450. At step 450, the watch module 230 keeps the watch open. In embodiments, the watch module 230 updates watch database 235 with data defining the updated watch, e.g., to reflect the update made at step 425, and maintains the watch in the watch database 235 for comparison to subsequent new entries. In a particular embodiment, step 450 includes the watch module 230 performing at least one of: sending a notification to a user (e.g., via the user interface 220), the notification indicating that the watch is has been adjusted based on the new entry (from step 400) and is still open; automatically entering a notation in the entry associated with the watch, the notation indicating that the watch has been adjusted based on the new entry (from step 400); and automatically generating a new entry in one of the databases in the form of adjustment entry (e.g., a rectification entry) related to the entry associated with the watch. After either one of steps 445 and 450, the process returns to step 400 to wait for subsequent new entries.

Referring back to step 420, in the event the highest association score is less than the high threshold, then this match does not qualify for an automatic update, and the process proceeds to step 430 where the watch module 230 suggests an update to a user, e.g., via the user interface 220. In embodiments, step 430 includes the watch module 230 prompting the user to confirm that the new entry (from step 400) matches the entry associated with the watch (determined at step 410).

At step 435, the system updates the watch (determined at step 410) based on user input. In embodiments, and as described herein, the user may provide input, e.g., via the user interface 220, to confirm that the new entry (from step 400) matches the entry associated with the watch (determined at step 410). Based on this input, the watch module 230 updates the watch, which may include updating a state of the watch, such as updating an amount of the watch.

Following step 435, the process proceeds to step 440 where the system determines whether the amount of the watch (after updating) equals zero and whether the entry associated with the watch has expired, in the manner already described herein.

Figure 5:
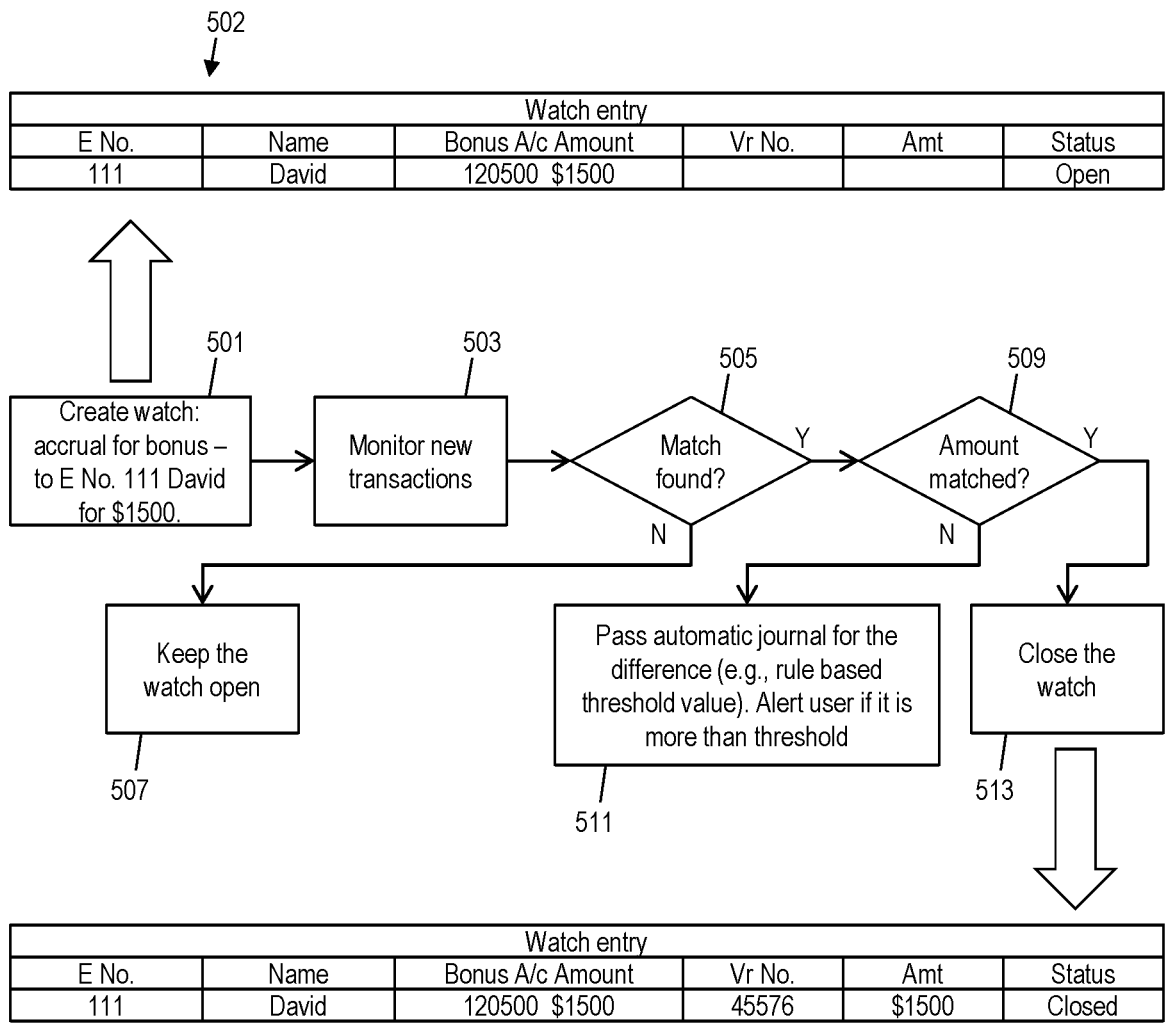
FIG. 5 depicts an exemplary use case in accordance with aspects of the invention.

FIG. 5 depicts an exemplary use case in accordance with aspects of the invention. The use case is an example of a transaction watch that is carried out in the environment of FIG. 2 using one or more aspects of the method of FIG. 4. At step 501, the watch module 230 detects a new entry in one of the databases 205a-n, determines that the new entry does not match a watch entry, and creates a new watch for this new entry. An exemplary data structure of the new watch is shown at element 502. At step 503, the watch module 230 monitors the databases for new transactions, e.g., as described herein. At step 505, for a new transaction, the watch module 230 determines whether a new transaction matches the watch entry from step 501, e.g., by determining association scores and comparing to thresholds as described herein. If the new transaction does not match the watch entry, then at step 507, the watch module 230 keeps the watch open. If the new entry does match the watch entry, then at step 509, the watch module 230 determines whether the amount of the new entry matches the amount of the watch entry. If the amounts do not match (e.g., are not equal), then at step 511 the watch module 230 automatically creates a new entry (e.g., a rectification entry) to account for the difference in the amount, e.g., as described with respect to step 450. In some implementations, the system closes the original entry after creating the rectification entry. If the amounts match (e.g., are equal), then at step 513 the watch module 230 closes the watch, e.g., as described with respect to steps 440 and 445. Although the user case in FIG. 5 is described in terms of a mismatched amount, implementations of the invention can be configured to create a rectification entry to handle other differences between the new entry and the watch entry, e.g., different amounts, different account types, different account numbers, etc.

Figure 6:
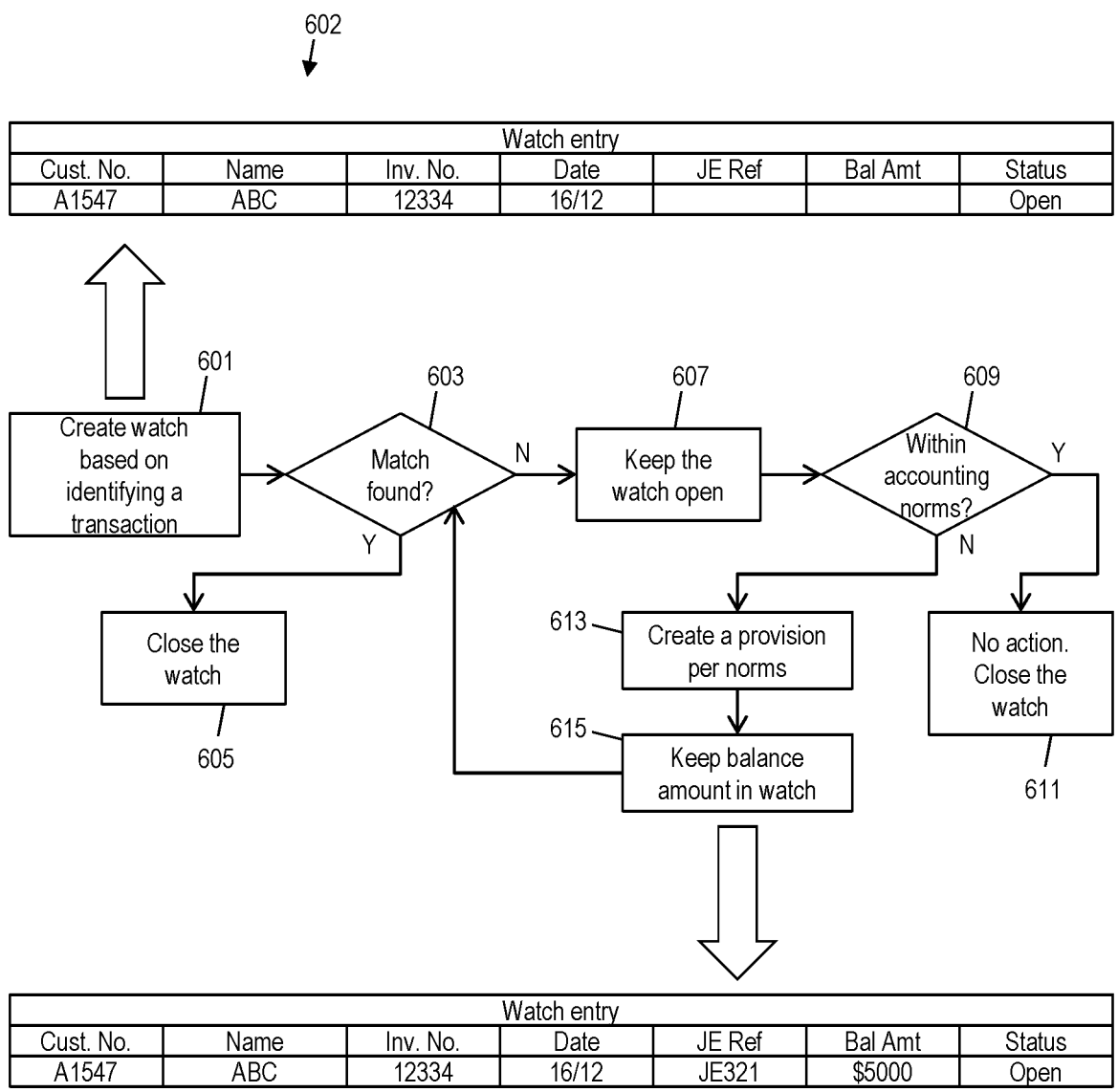
FIG. 6 depicts an exemplary use case in accordance with aspects of the invention.

FIG. 6 depicts an exemplary use case in accordance with aspects of the invention. The use case is an example of a compliance watch that is carried out in the environment of FIG. 2 using one or more aspects of the method of FIG. 4. At step 601, the watch module 230 creates a new watch based on a transaction that is identified using an accounting rule mandating that at a certain point in time after this transaction, a provision must be made. In this example, the watch is configured to monitor new transactions and determine if one of the new transactions matches this transaction. An exemplary data structure of the new watch is shown at element 602. At step 603, the watch module 230 monitors the databases for new transactions and determines whether a new transaction matches the watch entry from step 601. In this example, if match is found, then the watch is closed at step 605. If a match is not found, then at step 607 the watch is kept open. At step 609, the watch module 230 determines whether the open transaction (from step 601) is within accounting norms (e.g., complies with accounting rules) even though a match has not yet been found. If the open transaction is within accounting norms, then at step 611 the watch is closed since no further action is taken. If the open transaction is not within accounting norms, then at step 613 the watch module 230 creates a provision according to the norms. At step 615 the watch module 230 updates the amount of the watch for this open transaction based on the amount of the provision, and the process then returns to step 603.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
    entering a watch entry configured as a dynamic state machine to monitor an open entry in a watch database;
    detecting, by a computing device, a new entry in one of plural databases;
    comparing, by the computing device, the new entry to watch entries defined in the watch database of at least one open entry in an accounting database, wherein the comparing comprises determining a respective association score for the new entry relative to respective ones of the watch entries defined in the watch database based on attributes of the new entry and the ones of the watch entries defined in the watch database;
    determining, by the computing device, whether the new entry matches the watch entry in the watch database;
    creating, by the computing device, a new watch in the watch database when the new entry does not match any watch in the watch database; and
    updating, by the computing device, the watch in the watch database when the new entry matches the watch in the watch database.

2. The method of claim 1, wherein the association score is a quantitative measure of a likelihood that the new entry matches one of the watch entries defined in the watch database.

3. The method of claim 2, wherein the association score of the new entry relative to one of the watch entries defined in the watch database is determined based on:
one or more accounting rules; and
comparing attributes of the new entry and the one of the watch entries defined in the watch database.

4. The method of claim 3, wherein the attributes comprise:
relative timing of the new entry and the one of the watch entries defined in the watch database;
respective databases of the new entry and the one of the watch entries defined in the watch database;
text included in the new entry and the one of the watch entries defined in the watch database; and
amounts included in the new entry and the one of the watch entries defined in the watch database.

5. The method of claim 3, further comprising defining a range based on an amount in the one of the watch entries defined in the watch database, wherein the association score is higher when an amount in the new entry is within the range, and the association score is lower when the amount in the new entry is not within the range.

6. The method of claim 5, further comprising determining different ranges for different ones of the watch entries defined in the watch database.

7. The method of claim 1, wherein:
the watch entries are open entries that are the subject of watches defined in the watch database; and
the watches are dynamic state machines that define respective amounts.

8. The method of claim 1, wherein the updating the watch comprises automatically updating the watch without user input.

9. The method of claim 1, wherein the updating the watch comprises:
suggesting an update to a user via a user interface;
receiving confirmation of the update from the user; and
updating the watch based on receiving the confirmation from the user.

10. The method of claim 1, wherein the updating the watch comprises changing a value of an amount stored in the watch.

11. The method of claim 10, further comprising closing the watch when the changing the value of the amount stored in the watch results in a value of zero.

12. The method of claim 1, further comprising closing the watch when an open entry associated with the watch expires.

13. A computer program product, the computer program product comprising a computer readable storage medium having program instructions embodied therewith, the program instructions executable by a computer device to cause the computer device to:
enter a watch entry configured as a dynamic state machine to monitor an open entry in a watch database;
detect a new entry in one of plural databases;
compare the new entry to watch entries defined in the watch database of at least one open entry in an accounting database, wherein the comparing comprises determining a respective association score for the new entry relative to respective ones of the watch entries defined in the watch database based on attributes of the new entry and the ones of the watch entries defined in the watch database;
determine that the new entry matches one of the watch entries; and
update a watch amount associated with the one of the watch entries based on an amount in the new entry.

14. The computer program product of claim 13, wherein:
the association score is a quantitative measure of a likelihood that the new entry matches one of the watch entries; and
the association score of the new entry relative to one of the watch entries is determined based on: one or more accounting rules; and comparing attributes of the new entry and the one of the watch entries.

15. The computer program product of claim 13, wherein the updating the watch amount comprises automatically updating the watch amount without user input.

16. The computer program product of claim 13, wherein the program instructions cause the computer device to:
close a watch that defines the watch amount when the updating the watch amount results in a value of zero; and
keep the watch open and automatically generate a new rectification entry when the updating the watch amount results in a value other than zero.

17. The computer program product of claim 13, wherein the program instructions cause the computer device to close a watch that defines the watch amount when the one of the watch entries expires.

18. A system, comprising:
a processor, a computer readable memory, and a computer readable storage medium;
program instructions to enter a watch entry configured as a dynamic state machine to monitor an open entry in a watch database;
program instructions to detect a new entry in one of plural databases;
program instructions to compare the new entry to watch entries defined in the watch database of at least one open entry in an accounting database, wherein the comparing comprises determining a respective association score for the new entry relative to respective ones of the watch entries defined in the watch database based on attributes of the new entry and the ones of the watch entries defined in the watch database;
program instructions to determine whether the new entry matches a watch entry in the watch database;
program instructions to create a new watch in the watch database when the new entry does not match any watch in the watch database; and
program instructions to update a watch in the watch database when the new entry matches the watch in the watch database,
wherein the program instructions are stored on the computer readable storage medium for execution by the processor via the computer readable memory.

19. The system of claim 18, wherein:
the association score is a quantitative measure of a likelihood that the new entry matches one of the watch entries defined in the watch database;
the watch entries are open entries that are a subject of watches defined in the watch database;
the watches are dynamic state machines that define respective amounts;
the updating the watch comprises changing the value of an amount stored in the watch; and the creating the new watch comprises:
- creating a compliance watch requiring a provision in compliance with accounting rules at the expiration of a predetermined time;
- detecting a subsequent new entry in one of the plural databases;
- determining whether the subsequent new entry matches the compliance watch;
- determining whether the compliance watch complies with accounting rules when the subsequent new entry does not match the compliance watch;
- creating a provision for the compliance watch when the compliance watch does not comply with accounting rules; and
- updating the value of the amount stored in the compliance watch based on the value of the amount of the provision.

20. The method of claim 1, wherein the association score of the new entry relative to one of the watch entries defined in the watch database is adjusted based on:
- satisfying one or more accounting rules, including an accounting rule comprising an accrual is followed by a payment;
- comparing the relative timing of the new entry and the watch entry;
- comparing the databases of the new entry and the watch entry;
- comparing the text included in the new entry and the watch entry by applying natural language processing techniques that determine a text similarity score of the text; and
- determining the amounts included in the new entry and the watch entry are within a defined range of expected values for matching entries.

* * * * *